(12) United States Patent
Soumi et al.

(10) Patent No.: US 6,350,067 B1
(45) Date of Patent: Feb. 26, 2002

(54) BARRIER MECHANISM

(75) Inventors: Mitsuo Soumi; Takahisa Kawando, both of Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/493,649

(22) Filed: Jan. 28, 2000

(30) Foreign Application Priority Data

Jan. 29, 1999 (JP) .......................................... 11-022114

(51) Int. Cl.⁷ .............................................. G03B 17/02
(52) U.S. Cl. ...................................................... 396/448
(58) Field of Search ................................ 396/448, 349, 396/348; 150/166; 362/375; 352/221, 242; 359/511, 808; 353/119

(56) References Cited

U.S. PATENT DOCUMENTS 5,541,696 A * 7/1996 Bittner ........................ 396/448
5,625,852 A * 4/1997 Wada et al. ................. 396/349
5,805,947 A * 9/1998 Miyamoto et al. .......... 396/448
6,036,376 A * 3/2000 Owashi et al. .............. 396/349

FOREIGN PATENT DOCUMENTS

JP 7-168253 7/1995
JP 7-225409 8/1995

* cited by examiner

Primary Examiner—David M. Gray
(74) Attorney, Agent, or Firm—Birch, Stewart, Kolasch & Birch, LLP

(57) ABSTRACT

A lever member integrated with a barrier member is rotatably and tiltably supported about a pin which is equivalent to a rotary shaft of a gear member, and a pin secured to the gear member is loosely attached to the lever member. The movement of the tiltable barrier member is regulated by guide rails in contact with the reverse of the barrier member and guide rails formed at the reverse side of a front cover in such a way as to contact with the obverse of the barrier member. A lens peripheral part has a spherical surface whose center is on a lens optical axis. Each guide rail is formed along the spherical surface. A driving force of a motor is transmitted to the gear member to rotate and move the barrier member on the spherical surface to thereby withdraw the barrier member into a space (open position) beside the taking lens and behind the closed position.

6 Claims, 5 Drawing Sheets

F I G. 1
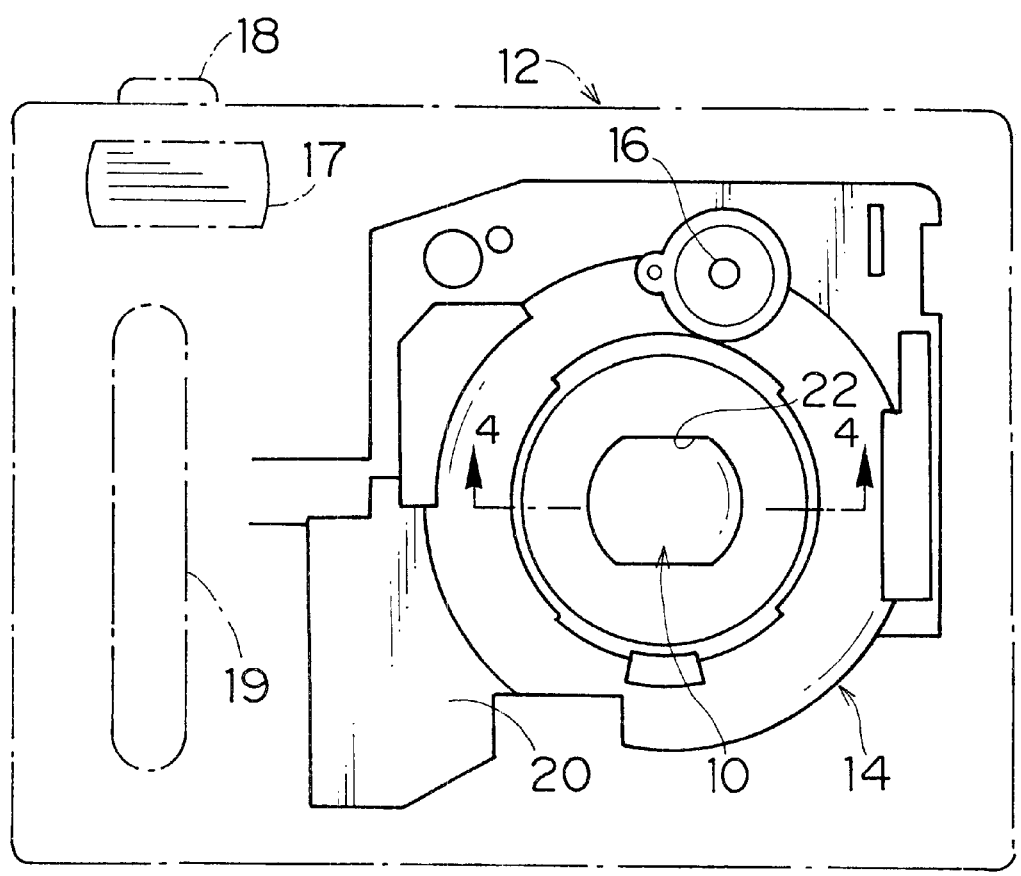

BARRIER MECHANISM

BACKGROUND OF THE INVENTION

1. Field of the Invention

The present invention relates generally to a barrier mechanism, and more particularly to a mechanism for moving a slidable lens barrier that is disposed in front of a taking lens in order to protect a photographing optical system of a camera or the like.

2. Description of Related Art

A variety of lens barrier mechanisms for a camera has already been proposed. For example, Japanese Patent Provisional Publication No. 7-168253 discloses a barrier moving mechanism that rotates a barrier within a plane perpendicular to a taking optical axis in such a manner as to prevent the barrier from going beyond the front area of a camera body while the barrier is being opened or closed. Japanese Patent Provisional Publication No. 7-225409 discloses a barrier mechanism that positions a shielding blade, which is movable forward and backward along an optical axis, in front of the end face of the lens while the barrier is closed, and withdrawing the blade from an effective optical path and moving back the blade so that at least a part of the blade can be positioned behind the end face of the lens while the barrier is opened.

The barrier moving mechanism in Japanese Patent Provisional Publication No. 7-168253, however, slides the barrier within the plane perpendicular to the optical axis of the lens, and this requires a space for containing the barrier at the periphery of the lens and thus swells the lens peripheral part. This makes it difficult to downsize the camera and restricts the design. The barrier mechanism of the Japanese Patent Provisional Publication No. 7-225409 is so completed as to require a number of parts.

SUMMARY OF THE INVENTION

It is therefore an object of the present invention to provide a barrier mechanism that makes the lens periphery of a camera even by effectively containing a barrier in a space of the lens periphery with a simple structure without increasing the number of parts and enlarges the freedom of design.

To achieve the above-described object, the present invention is directed to a barrier mechanism comprising: a barrier member capable of moving between a closed position for covering a front face of a taking lens and an open position behind said closed position, said barrier member is withdrawn to said open position from the front face of said taking lens; and a guide device that guides said barrier member from said closed position to said open position along a curved track which is described by projecting a moving locus of said barrier member on a plane perpendicular to an optical axis of said taking lens.

According to this invention, the barrier member is moved from the closed position to the open position along the curved track formed by the guide device. Thus, the barrier member can be contained in a relatively small space at the peripheral part of the taking lens in the barrier open state, and this downsizes the camera.

To achieve the above-described object, the present invention is directed to a barrier mechanism comprising: a barrier member capable of moving between a closed position for covering a front face of a taking lens and an open position behind said closed position, said barrier member is withdrawn to said open position from the front face of said taking lens; a lever member integrated with said barrier member or integrally connected with said barrier member; a support shaft that tiltably supports said lever member; a rotary member rotatably attached to the circumference of said support shaft and rotating by a driving force; a connecting member that connects said rotary member and said lever member, one end of said connecting member being secured to said rotary member and the other end being loosely attached to said lever member; and a guide device that regulates the movement of said barrier member moved by a driving force transmitted through said connecting member and said lever member to guide said barrier member from said closed position to said open position.

According to this invention, the lever member integrated with the barrier member is supported about the support shaft in such a manner as to rotate freely, and the lever member loosely connects to the connecting member. For this reason, the barrier member can be positioned arbitrarily, and the guide device regulates the movement of the barrier member. According to this invention, the barrier member can be moved along the curved surface by the simple structure. The barrier member can be moved along a curved surface desired by a designer according to the design of the guide device, and this increases the freedom of camera design.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 1 is a front view showing the essential parts of a camera provided with a barrier mechanism according to an embodiment of the present invention;

DETAILED DESCRIPTION OF THE PREFERRED EMBODIMENT

Figure 2:
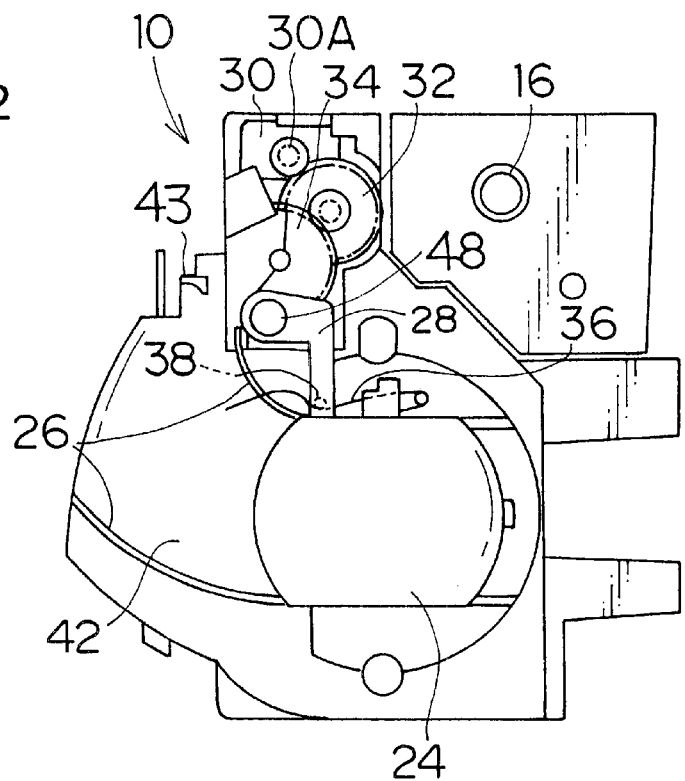
FIG. 2 is a front view of the inner structure of a lens peripheral part in the state wherein a barrier is closed.

This invention will be described in further detail by way of example with reference to the accompanying drawings.

FIG. 1 is a front view of a camera provided with a barrier mechanism according to an embodiment of the present invention in the state wherein a barrier is closed. The barrier mechanism 10 is applied to a lens part of a camera 12. In FIG. 1, a lens peripheral part 14 including the barrier mechanism 10 is indicated by a solid line, and the other parts are only sketched by long and short alternate lines. In FIG. 1, reference numeral 16 denotes a finder part; 17, a flash device; 18, a shutter release button; and 19, a grip part.

The lens peripheral part 14 has a spherical surface, that is convex toward the front, whose center is on an optical axis of a taking lens (reference numeral 40 in FIG. 3), and slightly protrudes from a flat surface of an outer casing cover 20 (a plane perpendicular to the optical axis) at the front of a camera body. A lens opening part 22 is formed in such a manner that top and bottom parts of a circle are cut off horizontally to prevent an unnecessary light from entering the taking lens 40 from above and below.

Figure 3:
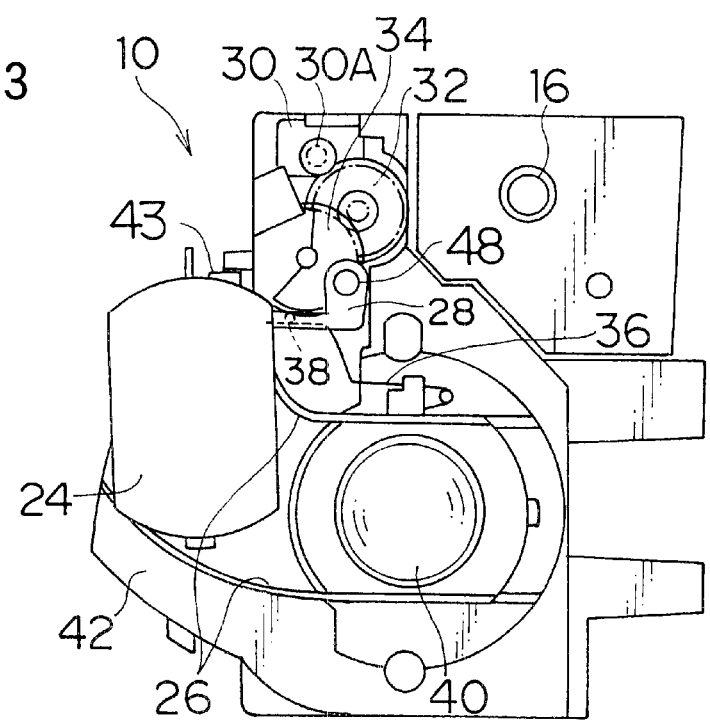
FIG. 3 is a front view of the inner structure of the lens peripheral part in the state wherein the barrier is open.

FIGS. 2 and 3 are front views showing the inner structure of the lens peripheral part 14 in which a front cover (denoted by reference numeral 44 in FIG. 4) is removed. FIG. 2 shows the closed state of the barrier, and FIG. 3 shows the open state of the barrier. As shown in FIGS. 2 and 3, the barrier mechanism 10 is comprised mainly of a barrier member 24; guide rails 26 for restricting the movement of the barrier member 24; a lever member 28 integrated with the barrier member 24; a motor 30 for driving the barrier member 24; gears 32, 34 for transmitting the driving force of the motor 30 to the lever member 28; and a spring member 36 for forcing the barrier member 24 to the right in FIG. 2 when the barrier is closed and forcing the barrier member 24 upward in FIG. 3 when the barrier is open.

The barrier member 24 is substantially shaped similarly to the lens opening part 22. The barrier member 24 has a spherical surface, which is convex toward the front of the taking lens 40 (see FIG. 4). A projection 38 is formed at the reverse side of the lever member 28 integrated with the barrier member 24, and the spring member 36 connects with the projection 38. The force of the spring member 36 is transmitted to the barrier member 24 through the projection 38.

The guide rails 26 form a track of the barrier member 24 that moves from a front position (a closed position) of the taking lens 40 to a withdrawal position (an open position) beside the taking lens 40. As stated previously, the periphery of the taking lens 40 has a spherical surface whose center is on the optical axis. The guide rails 26 are provided on a spherical surface of a plate member 42. A stopper member 43 for stopping the barrier member 24 is provided at the withdrawal position.

Figure 4:
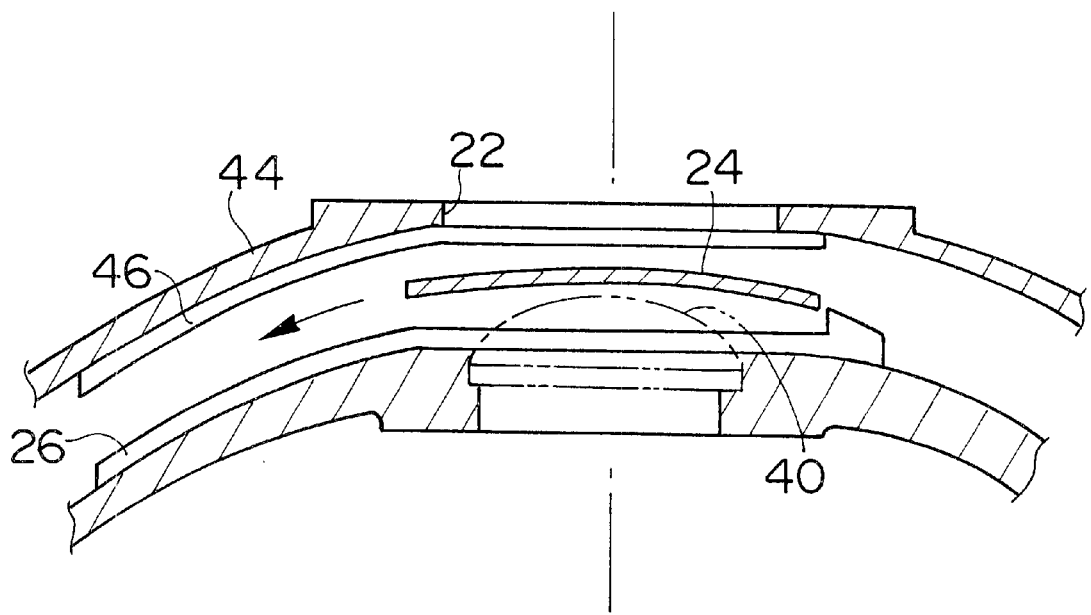
FIG. 4 is a sectional view taken along line 4—4 in FIG. 1.

FIGS. 2 and 3 illustrate only guide rails 26 in contact with the reverse of the barrier member 24, but as shown in FIG. 4, guide rails 46 in contact with the obverse side of the barrier member 24 are also provided at the reverse side of the front cover 44 in such a manner as to face the guide rails 26. In FIG. 4, the upper and lower guide rails 26, 46 are spaced for the convenience's sake, but they are actually close to each other to such an extent that the barrier member 24 can slide between them. The guide rails 26, 46 regulate the top and bottom faces of the barrier member 24, which moves along a predetermined track.

Although the structure for moving the barrier member 24 will be described later in further detail, the driving force of the motor 30 is transmitted to the lever member 28 to rotate the barrier member 24 vertically and the barrier member 24 is moved back from the closed position to a space beside the taking lens 40 along the spherical surface of the plate member 42 when the barrier member 24 is moved from the closed state in FIG. 2 to the open state in FIG. 3 (when the barrier is opened).

Figure 5:
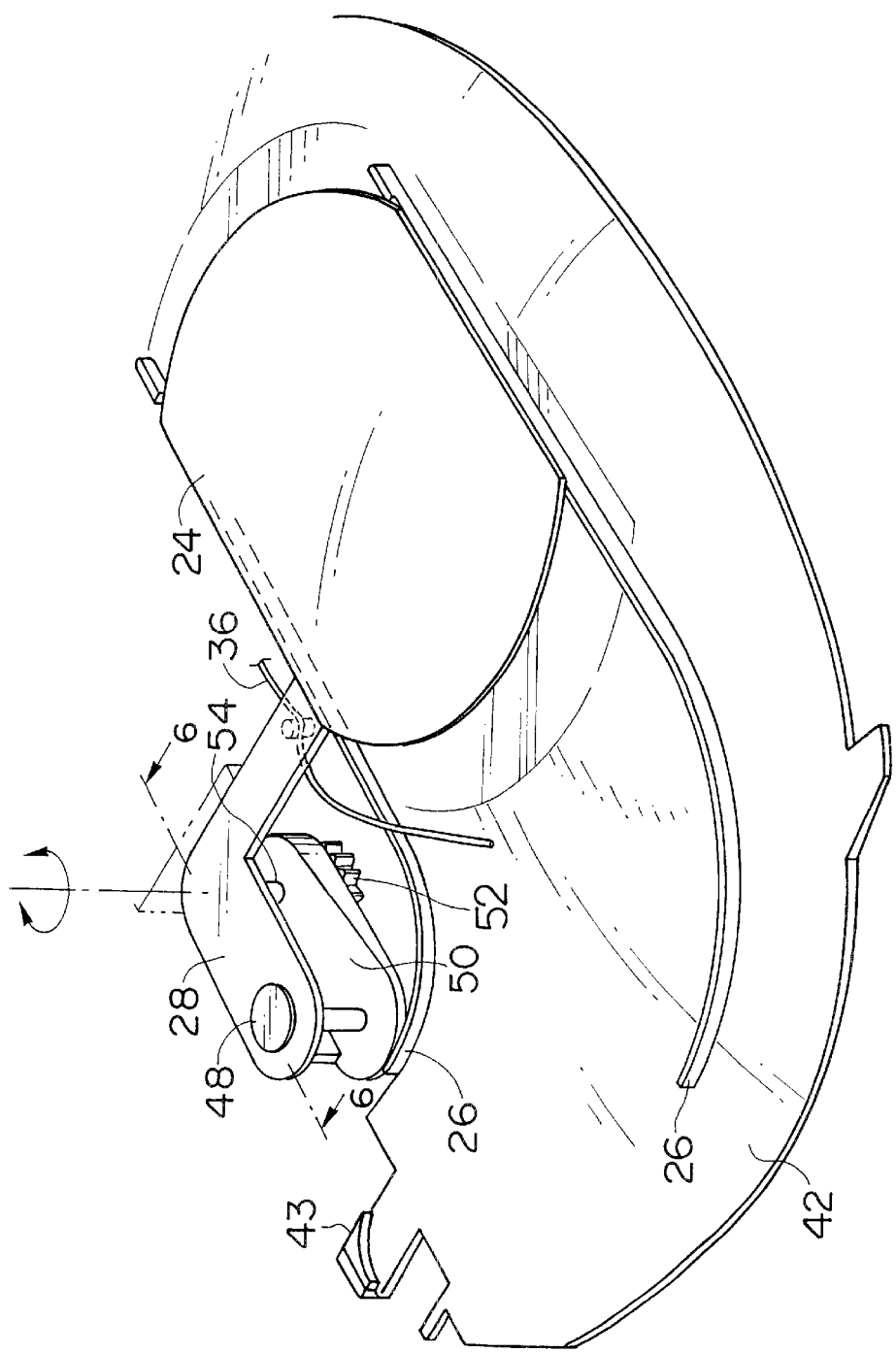
FIG. 5 is a perspective view showing the essential parts of the barrier mechanism according to the embodiment of the present invention.
Figure 6:
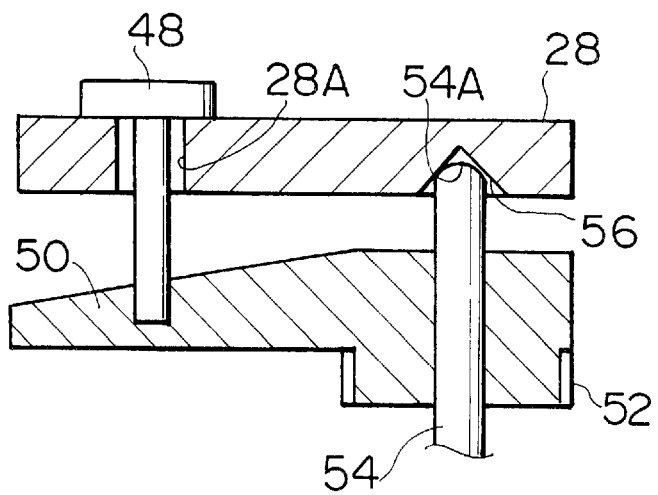
FIG. 6 is a sectional view taken along line 6—6 in FIG. 5.

FIG. 5 is a perspective view of the barrier mechanism 10, and FIG. 6 is a sectional view taken along line 6—6 in FIG. 5. The lever member 28 is substantially L-shaped, and is connected to a gear member 50 through a pin 48. The pin 48 is fixed at the top of the gear member 50, and the pin 48 is inserted into a hole 28A with a larger diameter than that of the pin 48. A gear 52 is integrated with the bottom of the gear member 50, and a pin 54 is inserted into a rotary shaft of the gear 52. The gear 52 is engaged with the gear 34 described with reference to FIGS. 2 and 3, and the driving force of the motor 30 is reduced and is transmitted to the gear member 50 via the gears 32, 34.

The pin 54, which is equivalent to a rotary shaft of the gear member 50, is fixed to a support block (not illustrated). An end 54A of the pin 54 is round, and the lever member 28 is tiltably supported by the pin 54. More specifically, a conic hole 56 is formed at the bottom of the lever member 28, and the pin 54 is fitted in the hole 56. Accordingly, the gear member 50 and the lever member 28 (the barrier member 24 integrated with the lever member 28) are able to rotate in the same direction about the pin 54. The end 54A of the pin 54 and the hole 56 in which the pin 54 is fitted are not necessarily shaped as stated above, but they may also be shaped in a variety of ways on condition that the lever member 28 is capable of smoothly tilting and rotating about the pin 54.

Figure 7:
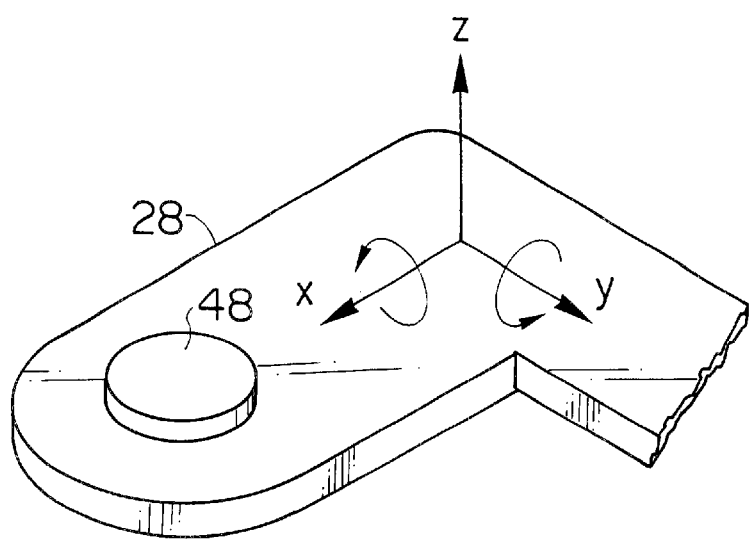
FIG. 7 is an explanation drawing showing a rotary shaft of a lever member in FIG. 5.

The lever member 28 (the barrier member 24 integrated with the lever member 28) is only supported from the bottom in FIG. 6 by the pin 54. The lever member 28 is able to freely rotate about the x-axis and the y-axis in FIG. 7 so far as a relation between the size of the pin 48 connecting the lever member 28 to the gear member 50 and the size of the hole 28A into which the pin 48 is inserted permits.

In this embodiment, the top and bottom faces of the barrier member 24 are properly guided by the guide rails 26, 46 as described with reference to FIG. 4 so that the barrier member 24 can slide outside a plane perpendicular to the optical axis of the taking lens 40.

A description will now be given of the operation of the barrier mechanism that is constructed in the above-mentioned manner.

When a rotary shaft 30A of the motor 30 is rotated counterclockwise in FIG. 2 from the barrier closed state, the driving force of the motor 30 is transmitted to the gear 52 of the gear member 50 through the gears 32, 34. Consequently, the gear member 50 rotates clockwise in FIG. 5 about the pin 54. In association with the rotation of the gear member 50, the barrier member 24 rotates in the same direction about the pin 54. The barrier member 24 is supported loosely in such a manner as to rotate arbitrarily about the x-axis and the y-axis since the pin 54 is fitted in the conic hole 56. The barrier member 24 is able to tilt freely so far as the relation in the size between the pin 48 and the hole 28A permits. Therefore, the barrier member 24 moves to the withdrawal position beside the taking lens 40 with the guide of the guide rails 26, 46 while changing the inclination thereof.

The withdrawal position (the open position) is on the spherical surface of the plate member 42. The barrier member 24 moves out of a plane perpendicular to the optical axis of the lens and stops at the open position slightly behind the closed position. The barrier member 24 describes an arc (about ¼ of a circle) if seen from the front, that is if the movement of the barrier member 24 is projected on a plane perpendicular to the optical axis of the taking lens 40. At the open position, the barrier member 24 is pressed upward in FIG. 3 by the operation of the spring member 34, and the open state is maintained after the stop of the motor 30.

The barrier is closed by running the motor 30 in the opposite direction to perform the reverse operation to the above-mentioned opening operation, so the closing operation will not be mentioned. The barrier member 34 at the closed position is forced to the right in FIG. 2 by the operation of the spring member 34, and the closed state is maintained after the stop of the motor 30.

As stated above, the barrier mechanism 10 of this embodiment moves the barrier member 24 along the spherical surface to the withdrawal position beside the taking lens 40. It is therefore possible to form the barrier mechanism 10 even in the camera 12 having the spherical lens peripheral part 14. The barrier mechanism 10 of this embodiment moves the barrier member 24 by the simple structure, and it is possible to provide the inexpensive and reliable camera.

In this embodiment, the camera has the spherical lens peripheral part, but this invention may also be applied to a camera having a conic or smoothly inclined lens peripheral part.

In this embodiment, the barrier member 24 is withdrawn to the position above the taking lens 40 off to the side in the open state, but there is no limitation to the withdrawal position of the barrier member 24. It is possible to change the withdrawal position in the design.

In this embodiment, the power of the motor opens and closes the barrier member 24, but it is also possible to open and close the barrier member 24 by transmitting a force generated by manual operation through a mechanical means.

As set forth hereinabove, the barrier mechanism of this invention moves the barrier member out of the plane perpendicular to the optical axis of the lens along the curved track from the closed position, where the barrier member covers the front face of the taking lens, to the open position behind the closed position. Therefore, the barrier member can be contained within a relatively small space at the lens peripheral part. This can downsize camera and make the lens peripheral part thin, and increases the possibility in design.

In the barrier mechanism of this invention, the support shaft tiltably supports the lever member integrated with the barrier member. The lever member loosely connects to the connecting member, which connects the barrier member and the powered rotary member. The guide device regulates the movement of the tiltable barrier member. This enables the barrier member to move along the curved surface by the simple structure. It is therefore possible to provide the inexpensive and reliable camera. The barrier member can be moved along a curved surface desired by a designer according to the design of the guide device, and this increases the freedom of design.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A barrier mechanism comprising:
   a barrier member capable of moving between a closed position for covering a front face of a taking lens and an open position, wherein said open position is to the side and slightly lower than said closed position, said barrier member is withdrawn to said open position from the front face of said taking lens; and
   a guide device that guides said barrier member from said closed position to said open position along a spiraled track which is described by projecting a moving locus of said barrier member on a plane perpendicular to an optical axis of said taking lens.

2. A barrier mechanism comprising:
   a barrier member capable of moving between a closed position for covering a front face of a taking lens and an open position, wherein said open position is to the side and slightly lower than said closed position, said barrier member is withdrawn to said open position from the front face of said taking lens;
   a lever member integrated with said barrier member or integrally connected with said barrier member;
   a support shaft that tiltably supports said lever member;
   a rotary member rotatably attached to the circumference of said support shaft and rotating by a driving force;
   a connecting member that connects said rotary member and said lever member, one end of said connecting member being secured to said rotary member and the other end being loosely attached to said lever member; and
   a guide device that regulates the movement of said barrier member moved by a driving force transmitted through said connecting member and said lever member to guide said barrier member from said closed position to said open position.

3. The barrier mechanism as defined in claim 1, wherein said guide device has a part that forms a track along a spherical surface whose center is on said optical axis of said taking lens.

4. The barrier mechanism as defined in claim 2, wherein said guide device has a part that forms a track along a spherical surface whose center is on said optical axis of said taking lens.

5. The barrier mechanism as defined in claim 1, further comprising a spring member that forces said barrier member in such a direction as to prevent said barrier member from moving toward said open position at said closed position and forcing said barrier member in such a direction as to prevent said barrier member from moving toward said closed position at said open position.

6. The barrier mechanism as defined in claim 2, further comprising a spring member that forces said barrier member in such a direction as to prevent said barrier member from moving toward said open position at said closed position and forcing said barrier member in such a direction as to prevent said barrier member from moving toward said closed position at said open position.

\* \* \* \* \*